United States Patent

[11] 3,607,725

| [72] | Inventor | Robert L. Irvine<br>Rob Nes, Pyle Hill, Woking, Surrey, England |
|---|---|---|
| [21] | Appl. No. | 810,127 |
| [22] | Filed | Mar. 25, 1969 |
| [45] | Patented | Sept. 21, 1971 |
| [32] | Priority | Mar. 27, 1968 |
| [33] | | Great Britain |
| [31] | | 14630/68 |

[54] HYDROCRACKING PROCESS
18 Claims, 1 Drawing Fig.

[52] U.S. Cl. .................................................. 208/89, 208/251
[51] Int. Cl. ............................................... C10g 23/10
[50] Field of Search ........................................... 208/88, 89, 143, 251, 157

[56] References Cited
UNITED STATES PATENTS
2,987,470  6/1961  Turken ........................ 208/253

Primary Examiner—Delbert E. Gantz
Assistant Examiner—R. M. Bruskin
Attorney—William R. Liberman ABSTRACT: The invention relates to the hydrogenation of nonhydrocarbons in crude or residua feed by the catalytic hydrogenation of the feed using a multibed reactor with descending catalyst and ascending feed, the conditions being so adjusted to produce fluidization of catalyst particles in each bed. The process is particularly suitable for treatment of crude or residua to be subjected to hydrocracking.

PATENTED SEP 21 1971
3,607,725
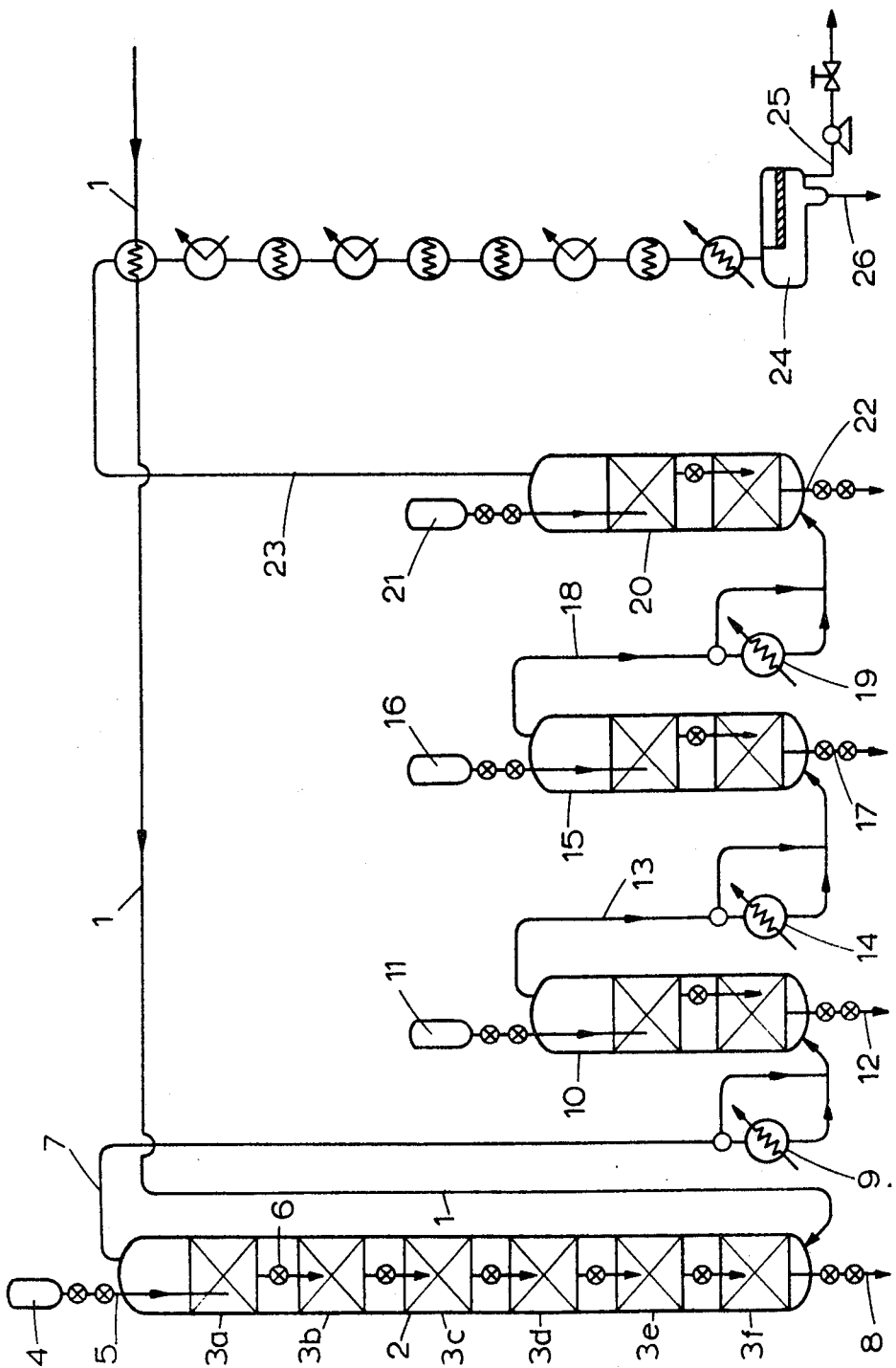
INVENTOR
ROBERT LEARD IRVINE
BY
William R. Lieberman
ATTORNEY

HYDROCRACKING PROCESS

This invention relates to a process for the hydrogenation of nonhydrocarbons in crude or residua feed and has particular application in the treatment of crude or residua feed which is to be subjected to further treatment, particularly hydrocracking.

It is known that crude and residua feed contains various impurities including oxygen, nitrogen, sulfur compounds and various metals and it is also known to be advantageous to remove as much as possible of these impurities before subjecting crude or residua feed to further treatments, particularly hydrocracking.

The invention provides a simple and effective method of treating crude and residua feeds prior to further treatment in such a way as drastically to reduce the content of nonhydrocarbon impurities, including metals. The concept of the invention is based upon treating the crude or residua feed in a metal removal reactor operating on the basis of an upflow of feed and a countercurrent downflow of catalyst material, the metal removal reactor being in the form of a plurality of separate beds through which the catalyst descends. The relationship of the descending catalyst to the ascending feed results in a fluidization of the catalyst particles within each bed of the metal removal reactor and this in itself produces considerable operating efficiencies.

Upflow for the hydrocarbon feed to be treated to remove metals and to hydrogenate nonhydrocarbons precludes reaction plugging and temperature control problems associated with fixed bed downflow reactors. The expanded upflow bed operation permits catalyst addition to the top bed, catalyst transfer from an upper bed to a lower bed, and withdrawal of spent catalyst from the lower bed, so that a given level of catalyst activity may be maintained throughout the processing period. This eliminates the shutdowns required for catalyst replacement or regeneration with fixed beds, and allows operations nearer to the limits of the catalyst system. Constant product quality is provided by maintaining a given activity. Upflow mixed phase also offers greater residence time for the liquid phase, defined pressure drop, and lower feed inlet temperatures for an initial catalyst bed temperature because of transference of heat through catalyst particle motion in the bed.

Upflow operation of heavier oils, together with addition and withdrawal of catalyst, has been previously contemplated by the H-oil process with the use of an ebullient bed, but his process has a limited conversion and a mechanical drawback in that a high temperature circulating pump together with necessary reactor internals, are required for maintaining sufficient liquid flow to ebulliate the beds. Hydrogenation is limited with this types of apparatus due to the recirculation of liquid product from the bed to combine with fresh feed entering the bed, thereby decreasing the concentration of components to be hydrogenated. Although this may be partly overcome with staged reactors in parallel beds, catalyst transference and recirculation dilution mass action effects remain, as well as the complexity and circulation equipment required.

With multibed reactors as in accordance with the present invention, countercurrent flow of catalyst to fresh charge moderates the carbon laydown, and permits hydrogenation of the remaining more refractory nonhydrocarbons in a more active catalyst bed. Although successive carbon laydown and increasing metal deposits decrease the activity of catalyst as it descends to lower beds in the multibed metal removal reactor, this is offset by mass action effects, i.e. higher concentration of nonhydrocarbons present to be hydrogenated.

In crude or residua hydrogenation, occlusion by metal deposits, not carbon, governs. A regeneration technique has limited applicability in such a service and also involves the loss of hydrocarbons.

Accordingly the present invention provides a process for the hydrogenation of nonhydrocarbons in crude or residua feed which comprises passing the crude or residua feed through a metal removal reactor comprising a plurality of catalyst beds through which catalyst falls progressively from the top of the reactor to the bottom while the crude or residua feed is fed upwardly through the catalyst beds in countercurrent to the catalyst flow and passing the residua hydrocarbon from the metal removal reactor to a separator stage.

This treatment in the metal removal reactor achieves desulfurization simultaneous hydrogenation of the bulk of nonhydrocarbons and the removal of metals, in particular vanadium.

A relatively inexpensive catalyst is introduced to the top of this upflow multibed mixed phase reactor, and progresses consecutively through lower bed transfers until the catalyst is withdrawn from the lowest bed after having been in contact with heated raw charge and a major part of the hydrogen makeup.

As stated above the catalyst is introduced into the top of the metal removal reactor while the residua feed is introduced at the bottom and the feed ascends the reactor in countercurrent to the descending catalyst. It is preferred that the lowermost bed in the metal removal reactor has a larger volume than any one of the succeeding beds. This difference in volume between the lower bed and succeeding beds is preferred since this results in a major proportion of the exothermic reactions taking place in the lowermost bed of the metal removal reactor resulting in a temperature jump-up from the feed temperature and a progressive increase in temperature as the feed ascends the metal removal reactor producing a satisfactory ascending temperature gradient up the reactor. The introduction of catalyst at the top of the reactor means that fresh catalyst is present in contact with the least active feed material again producing ideal conditions for effective hydrogenation of nonhydrocarbons and metal removal. Suitable design of the metal removal reactor, with particular reference to the volume of the lowermost bed results in a well controlled ascending temperature gradient up the reactor producing an outlet temperature at the top of the reactor of the order of 750° F. which is the desired optimum temperature.

In another embodiment of the process of the invention the metal removal reactor is split into two or more stages, treated hydrocarbon from the first stage passing into the base of the second stage and so on. In this embodiment it is only the first stage of the metal removal reactor which is provided with a lowermost bed of greater volume than any succeeding bed. As staged previously the outlet temperature from the metal removal reactor, in this case the first stage, is 750° F. and it is arranged that the outlet temperature from the final stage of the metal removal reactor is not more than about 800° F. These temperatures are found to be particularly advantageous with regard to carbon deposition during catalyst treatment.

Cost of catalyst replacement is a major consideration in crude or residua hydrogenation, and the disclosed process reduces catalyst cost by using a metal removal reactor which uses an inexpensive catalyst, which is effective for metal removal and hydrogenation of nonhydrocarbons, in the upflow, mixed phase multibed reactor.

In a preferred embodiment of the process using a single stage the multibed reactor comprises six beds which permit transfer between beds countercurrent to the feed by gravity through a mechanical or hydraulic catalyst transfer device, a feed containing 1,000 parts per million of metals will have metals sufficiently removed so that the metal removal reactor product effluent contains less than 1 part per million of metals. Because of metals contained in crude residuas, the proposed multibed upflow metal removal reactor permits sufficient concentration of the vanadium and nickel contained in these sources to become an economic spend catalyst byproduct and thereby offset the cost of desulfurizing crude or residuas.

As previously stated the process of the present invention has particular application in the treatment of crude or residua feed in a hydrocracking process. Accordingly the present invention therefore also provides a process for the hydrocracking of crude or residua feed which comprises passing the crude or residua feed through a metal removal reactor comprising a plurality of catalyst beds through which catalyst falls progressively from the top of the reactor to the bottom while the crude or residua feed is fed upwardly through the metal removal reactor in countercurrent to the catalyst flow, discharging the crude or residua hydrocarbon from the metal removal reactor and passing it by way of a quench heat exchange stage to a hydrocracker reactor and thereafter passing the hydrocracked feed to a separator stage, if desired by way of further quench heat exchange stages and further hydrocracker reactors.

They hydrocracker reactors also operate on a fluidized bed principle.

The hydrocracker reactors employ a relatively expensive, active hydrocreaking catalyst to achieve a selected conversion. A relatively expensive hydrocracking catalyst is permitted as metal contamination and the carbon content of the raw feed, is no longer a factor in maintaining activity. Activity, may therefore be maintained in an hydrocracker reactor by generation the catalyst withdrawn from the lower bed and reintroducing this restored activity catalyst to the top bed.

Metal removal multibed reactor followed by multibed hydrocracker reactor(s) with heat exchanger between reactors permit:

1. An adequate supply of hydrogen for the metal removal reactor.
2. Increased hydrogen partial pressure in the metal removal reactor because the makeup hydrogen is sufficient without using recycle hydrogen as quench. Recycle hydrogen purity (quench hydrogen source) is considerably less than the hydrogen makeup source due to hydrogen consumption and subsequent concentration of the light hydrocarbon byproducts formed, as well as those originally in the hydrogen makeup. Hydrogen partial pressure is particularly important for the hydrogenation of nonhydrocarbons and moderating the carbon laydown in the metal removal reactor where the heaviest hydrocarbons are present.

Lower hydrogen partial pressure may be tolerated after nonhydrocarbon hydrogenation in the successive hydrocracking reactor(s) as the heaviest polyaromatics are preferentially hydrocracked so that fouling characteristics decrease simultaneously with the lowering of hydrogen partial pressure due to pressure drop, light end formation and quench hydrogen introduction. A lower hydrogen pressure, together with the high hydrogen sulfide partial pressure afforded by the metal removal reactor, is conducive to the formation of monoaromatic products. Monoaromatics are not only desirable from a yield viewpoint, but also decrease the chemical hydrogen requirements for achieving a given conversion.

The metal removal reactor employs a catalyst such as nickel molybdenum which has an alumina base which is suitable for metal removal. Coke laydown is moderated in the upper beds by controlling the upper beds to approximately 750° F. through hydrogen quench addition. This permits the catalyst to have sufficient nonhydrocarbon hydrogenation activity without any intermediate regeneration. The catalyst preferentially used has very little hydrocracking activity at this temperature, which avoids introducing higher consumption through the introduction of thermal degradation reactions. Controlling the upper temperature favors splitting carbon with nonhydrocarbon linkages over carbon with carbon linkages.

An upflow mixed phase reactor has the advantage in that it permits the use of a smaller catalyst, particularly for the metal removal reactor which requires accessible surface to achieve effective metal removal. Because the proposed multibed upflow reactor distributes the required catalyst in a longer but smaller diameter reactor, the velocity of the liquid phase is sufficient to secure an expanded bed of tumbling catalyst particles. This eliminates the mechanical difficulties of a high temperature obulliating circulating pump, together with the reduced mass action effects caused by such a device.

The multibed reactor, using an inexpensive multibed metal removal reactor, is employed first to remove the metals and most of the nonhydrocarbons and, if it is desired to convert part of the residua or crude by hydrocracking, this is followed by reactor(s) containing a nitrogen resistant bifunctional catalyst, such as 'Unicracking catalyst,' which is very active and extremely selective for the hydrocracking reaction.

A multistage upflow bed is also preferred for the hydrocracking reactor as long as sufficient liquid phase is present. Because molecular weight continuously decreases, larger catalyst sizes are permitted for the hydrocracker catalyst to offset the increase in volume. A successive downflow fixed bed hydrocracking reactor may follow if the conversion approached the vapor phase but, at these conversion levels, it would be preferable to separate the material desired for further conversion and perform further hydrocracking in the absence of nitrogen and sulfur. The nature of hydrocracking is such that if these conversion levels are desired, it is better the recycle the heavier fraction from separation to the last hydrocracker reactor. This increases the concentration of heavier fractions desired to be hydrocracked in the last reactor, and prevents overcracking. This recycle has the added advantage of preserving a liquid phase for a higher, ultimate conversion.

Quench hydrogen flow is reduced by heat exchange between reactors. With the elimination of metal from the charge, the spent catalyst from successive sections of the hydrocracking reactor, may be successfully regenerated and returned to the top of the particular hydrocracking section to maintain a given activity level in the hydrocracking reactor.

The use of a multibed metal removal reactor using a relatively inexpensive catalyst for metal removal and hydrogenation of most of the nonhydrocarbons followed by successive reactors containing an expensive, highly active hydrocracking catalyst, permits decreasing pressures. For bulk hydrogenation of nonhydrocarbons, the inexpensive metal removal catalyst is as effective as the expensive hydrocracking catalyst, so that the multibed metal removal reactor, in achieving a higher sulfur and nitrogen removal, permits the expensive catalyst to be used more selectively.

Increased hydrogenation of nonhydrocarbons and relative freedom from unsaturates, overcome the real operational concern of reactor effluent exchanger fouling and asphalt precipitation that occurs with heavier feeds in other reactor systems. The equipment disadvantages of separating a liquid phase at hot temperatures with its hydrogen solution to overcome this problem in the case of the H-oil system, is avoided. The multibed reactor with countercurrent catalyst flow achieves a high, overall conversion of nonhydrocarbons in spite of maintaining moderate temperatures which avoid substantial thermal degradation. Effluent exchanger fouling and asphalt precipitation become further remote when an hydrocracking reactor with an highly active catalyst follows the metal removal reactor. Hydrocracking is achieved at a temperature comparable to the metal removal reactor.

Heat exchange that occurs between the metal removal reactor and the successive hydrocracking reactor(s), is employed to achieve separation of the products. The heat exchange not only achieves substantial utility savings, but make practical the use of the multibed upflow reactor for hydrocracking in that it retains a substantial liquid phase and moderates the superficial velocity of the vapor phase in these successive reactors. Two bed reactors with quench heat exchange between reactors, are preferably employed for the successive hydrocracker reactor(s). This permits maintaining the superficial velocity within practical design limits by increasing successive reactor diameters. Such quench heat transfer between reactors preserves the liquid phase to a greater conversion level by reducing quench hydrogen requirements. Through such an arrangement, the vaporization of hydrocarbons aids bed temperature control as its role in removing heat of reaction is more effective. In practice, this further reduces the quantity of quench hydrogen required, although the design of the quench hydrogen compressor neglects this effect as well as the transference of heat through catalyst particle motion, which permits a lower feed temperature (greater quench transfer heat removal) between reactors.

A major advantage of the mixed phase upflow multibed reactor arrangement is that the liquid phase has the longest residence time and the components which are desired to be hydrogenated concentrate in this phase.

The combination permits using the substantial heat of reaction to be employed to supply the heat for separating the hydrogenated product into its fractions. A fired heater is necessary only for startup and this permits a substantial utility and equipment saving in the processing and conversion of heavier gravity crudes.

Economic recovery of the ethane and heavier byproducts is permitted as the hydrocracked hydrocarbon product serves as a solution phase.

It is preferred that the catalyst used in the metal removal reactor is presulfided before it is introduced into the metal removal reactor. Conveniently this presulfiding can be carried out by using high pressure off gas produced in the process which contains hydrogen, hydrogen sulfide and heavy hydrocarbons. The use of high pressure off gas is particularly convenient, not only because the gas is readily available from the process but because the constituents of the gas each contribute useful effects. The hydrogen present in the gas produces a reduction of the catalyst particles and this assists in the minimization of coke laydown in the metal removal reactor. The presence of hydrogen sulfide in the gas results in the generation of heat of reaction and the presence of heavy hydrocarbons presaturates the catalyst giving rise to heat of wetting.

One embodiment of the process of the invention as applied to the treatment of crude or residua feed which is to be subsequently subject to hydrocracking is illustrated in the accompanying drawings.

Referring now to the drawings crude or residua feed is fed by way of line 1 into a metal removal reactor 2. The metal removal reactor comprises six catalyst beds, 3a to 3f. Catalyst is fed from container 4 by way of line 5 into the uppermost bed 3a and it passes from this bed by way of catalyst transfer valve 6 into the second bed, 3b and thence progressively down the metal removal reactor until the spent catalyst is discharged through line 8. The relationship between the feed of crude or residua material from line 1 and the particle size and rate of addition of catalyst through line 5 is so regulated as to produce a fluidized condition of the catalyst particles in each of the beds 3a to 3f. It can be seen also that the least active catalyst is in contact with the most active feed in bed 3f whereas the most active catalyst is in contact with the least active feed in bed 3a. This combination of catalyst and feed activity is of course advantageous in ensuring a maximum removal of nonhydrocarbon materials and metals. Treated hydrocarbon passes from the metal removal reactor by way of line 7 through quench heat exchanger 9 into a first hydrocracker reactor 10. As illustrated the hydrocracker reactor contains two catalyst beds catalyst passing from one bed to the other by way of a catalyst transfer valve. Catalyst is fed to the hydrocracker reactor from container 11. Again the rate of feed through line 7 and quench heat exchanger 9 into the hydrocracker 10 is so adjusted in accordance with the rate of feed and particle size of catalyst from container 11 that each of the two beds in the hydrocracker reactor contain catalyst in a fluidized condition. Spent catalyst is discharged from the hydrocracker by way of line 12. Partially hydrocracked material leaves the hydrocracker by way of line 13 and quench heat exchanger 14 and passes into a second hydrocracker reactor, 15. Again the material is contacted with catalyst provided from container 16 which is in the form of two fluidized beds, the catalyst passing from one bed to the other by way of a catalyst transfer valve, spent catalyst being discharged at 17. Treated material from the second hydrocracker reactor then passes by way of line 18 and quench heat exchange 19 into a final hydrocracker reactor 20 where it is treated in two fluidized catalyst beds supplied with catalyst from container 21. Spent catalyst is discharged through line 22. Fully hydrocracked material passes out from the final hydrocracker reactor through line 23 and byway of various heat exchanger stages to a high pressure separator 24 from which hydrocarbon is passed to separation by way of line 25. The separator has an outlet 26 to sour water facilities.

As stated previously the metal removal reactor stage can be split into two or more stages connected in series and it is also preferred, whether one or more stages is used, that the lowermost bed (3f in the embodiment described) shall be larger in volume than any of the succeeding beds (3e to 3a in the embodiment described).

What I claim is:

1. A process for the hydrogenation of nonhydrocarbons in crude or residua feed which comprises passing the crude or residua feed and hydrogen through a metal removal reactor comprising a plurality of catalyst beds through which catalyst falls progressively from the top of the reactor to the bottom while the crude or residua feed is fed upwardly though the catalyst beds in countercurrent to the catalyst flow at a velocity sufficient to maintain said descending catalyst in a fluidized state and passing the residua hydrocarbon from the metal removal reactor to a separator stage, the temperatures and pressures of said crude or residua feed and said being within the ranges to effect the hydrogenation of said nonhyocarbons in the presence of said catalyst.

2. a process as claimed in claim 1 wherein the metal removal reactor is split into two or more 750° stages, the treated hydrocarbon from the first stage passing to the base of the second stage, the outlet temperature from the first stage being controlled at about 750° F. and the outlet of the second stage being controlled at not more than about 800° F., and wherein the lowermost bed of the first stage of the metal removal reactor is larger in volume than any of the succeeding beds whereby the outlet thereof consequent to the reactions therein is about 750° F.

3. A process as claim in claim 2 wherein the conditions of catalyst feed rate and particle size of crude or residua feed are adjusted to produce fluidization of the catalyst particle in each bed.

4. A process as claimed in claim 3 wherein spent catalyst discharged from the metal removal reactor is generated and recycled to the reactor.

5. A process as claimed in claim 1 wherein the catalyst used in the metal removal reactor is a catalyst capable of removing metals contained in the hydrocarbon and also of removing a substantial proportion of nonmetallic nonhydrocarbons contained in the crude or residua feed.

6. A process as claimed in claim 5 wherein the catalyst used in the metal removal reactor is a nickel, cobalt, molybdenum or combination of these active metals on an alumina carrier.

7. A process as claimed in claim 5 wherein the catalyst, before supply to the metal removal reactor or reactors is presulfided.

8. A process as claimed in claim 7 wherein the catalyst is presulfided using high pressure off gas produced in the process containing hydrogen, hydrogen sulfide and heavy hydrocarbons.

9. A process for the hydrocracking of crude or residua feed which comprises passing the crude or residua feed and hydrogen through a metal removal reactor comprising a plurality of catalyst beds through which catalyst falls progressively from the top of the reactor to the bottom while the crude or residua feed is fed upwardly through the metal removal reactor in countercurrent to the catalyst flow at a velocity sufficient to maintain said descending catalyst in a fluidized state, discharging the crude or residua hydrocarbon from the metal removal reactor and passing it by way of a quench heat exchange stage to a hydrocracker reactor and thereafter passing the hydrocracked feed to a separator stage by way of further quench heat exchange stages and further hydrocracker reactors, the temperatures and pressures of said crude or residua feed and said hydrogen in said metal reactor being within the ranges to effect the hydrogenation of said nonhydrocarbons in the presence of said catalyst.

10. A process as claimed in claim 9 wherein the quantity and rate of addition of catalyst to the metal removal reactor and the rate of passage of the catalyst from one bed to another of the reactor is so arranged that in conjunction with the throughput rate of crude or residua feed to the metal removal reactor the catalyst within each bed is in a fluidized condition.

11. A process as claimed in claim 9 wherein spent catalyst discharged from the metal removal reactor is regenerated and recycled to the reactor.

12. A process as claimed in claim 9 wherein the catalyst used in the metal removal reactor is a catalyst capable of removing metals contained in the hydrocarbon and also of removing a substantial proportion of nonmetallic nonhydrocarbons contained in the crude or residua feed.

13. A process as claimed in claim 12 wherein the catalyst used in the metal removal reactor is a nickel, cobalt, molybdenum or combination of these active metals on an alumina carrier.

14. A process as claimed in claim 9 wherein the metal removal reactor is split into two or more stages, the product hydrocarbon from the first stage being passed to the bottom of the second stage, the outlet temperature of the first stage being controlled at about 750° F. and the outlet temperature of the second stage being controlled at about not more than 800° F.

15. A process as claimed in claim 4 wherein spent catalyst from any given hydrocracker reactor is reactivated and recycled to the hydrocracker reactor.

16. A process as claimed in claim 9, wherein the catalyst, before supply to the metal removal reactor or reactors is presulfided.

19. A process as claimed in claim 16 wherein the catalyst is sulfided using high pressure off gas produced in the process containing hydrogen, hydrogen sulfide and heavy hydrocarbons.

18. A process as claimed in claim 9 wherein the hydrocracker reactors are two-bed reactors with quench heat exchange stages between beds or multistage reactors with heat exchange occurring within the bed as permitted by the good heat transfer afforded by a fluidized reactor system in a stage.

PO-1050
(5/69)

UNITED STATES PATENT OFFICE
CERTIFICATE OF CORRECTION

Patent No. 3,607,725    Dated September 21, 1971

Inventor(s) Robert L. Irvine

It is certified that error appears in the above-identified patent and that said Letters Patent are hereby corrected as shown below:

In claim 1 of the patent, line 11, before "being" there should be added the word --hydrogen--.

Signed and sealed this 5th day of December 1972.

(SEAL)
Attest:

EDWARD M. FLETCHER, JR.              ROBERT GOTTSCHALK
Attesting Officer                    Commissioner of Patents